US010906687B2

(12) United States Patent
James et al.

(10) Patent No.: US 10,906,687 B2
(45) Date of Patent: Feb. 2, 2021

(54) SYSTEMS AND METHODS FOR CUSTOM LABELING OF PRODUCTS

(71) Applicant: Penrose Hill, New York, NY (US)

(72) Inventors: Philip James, New York, NY (US); Erik Steigler, New York, NY (US); Carolin Meier, Albany, CA (US)

(73) Assignee: Penrose Hill, Napa, CA (US)

( * ) Notice: Subject to any disclaimer, the term of this patent is extended or adjusted under 35 U.S.C. 154(b) by 286 days.

(21) Appl. No.: 16/034,714

(22) Filed: Jul. 13, 2018

(65) Prior Publication Data

US 2019/0016495 A1 Jan. 17, 2019

Related U.S. Application Data

(60) Provisional application No. 62/533,444, filed on Jul. 17, 2017.

(51) Int. Cl.

| | |
|---|---|
| ***B32B 41/00*** | (2006.01) |
| ***B65C 9/46*** | (2006.01) |
| ***B65C 9/18*** | (2006.01) |
| ***B65C 9/04*** | (2006.01) |
| ***B65C 3/08*** | (2006.01) |
| ***B65C 11/02*** | (2006.01) |
| ***B65C 11/00*** | (2006.01) |

(52) U.S. Cl.

CPC .................. *B65C 9/46* (2013.01); *B65C 3/08* (2013.01); *B65C 9/04* (2013.01); *B65C 9/18* (2013.01); *B65C 11/002* (2013.01); *B65C 11/02* (2013.01); *B65C 2210/0013* (2013.01)

(58) Field of Classification Search

CPC ......... B65C 9/46; B65C 11/02; B65C 11/002; B65C 9/18; B65C 9/04; B65C 3/08; B65C 2210/0013

USPC .................... 156/60, 64, 350, 351, 378, 379

See application file for complete search history.

(56) References Cited

U.S. PATENT DOCUMENTS

2002/0133434 A1* 9/2002 Nevel .................... G06Q 10/08 705/28

2016/0052659 A1* 2/2016 Bowers .................. B65C 1/021 156/64

* cited by examiner

*Primary Examiner* — Michael N Orlando

*Assistant Examiner* — Joshel Rivera

(74) *Attorney, Agent, or Firm* — Buckley, Maschoff & Talwalkar LLC

(57) ABSTRACT

A method of custom labeling products in which users specify, via a purchasing interface, product label images in correspondence with products. A label group is generated for each of the users. The label group includes an indicator label image providing a purchase identifier and product identifiers, and the product label images arranged in a sequence specified by the product identifiers. The label groups are printed to produce printed label groups. The printed label groups are transferred to a labeling machine. A conveyor system is controlled to release, for each of the printed label groups, the sequence of the products specified by the product identifiers. Printed product labels of each of the printed label groups are applied to the corresponding sequence of the products.

26 Claims, 9 Drawing Sheets

SYSTEMS AND METHODS FOR CUSTOM LABELING OF PRODUCTS

FIELD OF THE INVENTION

The disclosed embodiments are directed to the custom labeling of products. In particular, the disclosed embodiments are directed to the custom labeling of consumer products on an item-by-item basis in a continuous production process.

BACKGROUND

Conventional approaches to the production of consumer products are designed around efficiency and economies of scale, so whether one is manufacturing toothpaste or running a winery producing chardonnay, the objective is to put together a large production run so that everything is cheaper. In the case of labeled bottles of wine, efficiency is achieved by buying or producing a large quantity of bottles of chardonnay, for example, and a large quantity of labels and running a labeling line continuously over an extended period of time. When the labeling of the chardonnay is completed, then one might proceed with labeling a different type of wine, such as cabernet sauvignon. This conventional approach results in efficiency and lower cost but does not necessarily suit the needs of the consumer. Specifically, in terms of the personalization on the outside of the bottle, "one size" does not necessarily fit all. In other words, conventional approaches do not always provide the best experience for the customer.

SUMMARY

In one aspect, the disclosed embodiments provide a method, and corresponding system and software, for custom labeling products. The method includes providing to one or more users, using a server, a purchasing interface displayed on a web browser running on a computer connected to the server via a network. Input, by the one or more users via the purchasing interface, is accepted specifying one or more product label images in correspondence with one or more products. A label group is generated for each of the one or more users, including an indicator label image providing a purchase identifier and one or more product identifiers, and the one or more product label images arranged in a sequence specified by the product identifiers. The printing of the label groups is initiated to produce one or more printed label groups. A conveyor system is controlled to release, for each of the printed label groups, the sequence of the products specified by the product identifiers. A labeling machine is controlled to apply printed product labels of each of the printed label groups to the corresponding sequence of the products and to output the labeled products.

Particular embodiments may include one or more of the following features.

The printed label groups may be transferred to the labeling machine continuously (e.g., a continuous stream) or in batches (e.g., with manual spooling and loading). The labeling machine may read the indicator label image of each printed label group to perform labeling according to the sequence of the products. The labeling machine may be controlled by the server to perform labeling according to the sequence of the products. The specifying of the one or more product label images may include creating a product label image using the purchasing interface. The creating of the product label image may include selecting a template from a set of templates and editing associated text to be displayed in the created product label image. The creating of the product label image may include adding an image to be displayed in the created product label image. The creating of the product label image may include entering a uniform resource locator identifying one or more images and/or text to be displayed in the created label image. The uniform resource locator may identify a news article or a social media post. The products may be bottles of wine, and the printed product labels may form front labels of the bottles, in which case the bottles may have back labels affixed prior to being loaded in the conveyor system. The labeling machine may be configured to rotate the bottles to align placement of the front labels opposite the back labels based on guide lines formed on the back labels. The generating of the label group for each of the one or more users may include: receiving specified product label images from a plurality of users of the one or more users; grouping the received product label images for each user of the plurality of users; and creating the indicator label image based on the grouped product label images. The conveyor system may include a plurality of product feeds, each of the feeds having a gate which is controlled so that the products are released in the sequence specified by the product identifiers of the label group.

DETAILED DESCRIPTION

Disclosed embodiments include a process that produces a labeled bottle of wine one at a time, which is contrary to conventional approaches as to how a winery should run. For example, the main bottling line of a winery might run at 120 bottles per minute, 8 or 16-hour shifts at a time, thereby producing tens of thousands of products that are identical, i.e., have the same type of wine and the same label.

In disclosed embodiments, the system allows a customer to order a bottle of wine, e.g., red wine which has a first message on its label, a rosé which has a second message on its label, and a white wine which has a third message on its label. Another customer can place an order immediately following this order which would have an entirely different combination of wines and corresponding labels. Thus, there is essentially infinite variability in the order in which the wines are selected and labeled with customer-specific labels. An image might be selected or generated by a customer, e.g., on a website or via some other method of submission into the system. The system may then validate that the image is a proper size, i.e., that it will work as a wine label. The system groups all of the incoming images from various users into customer-specific, i.e., order-specific, groupings to recreate a production sequence.

Figure 1:
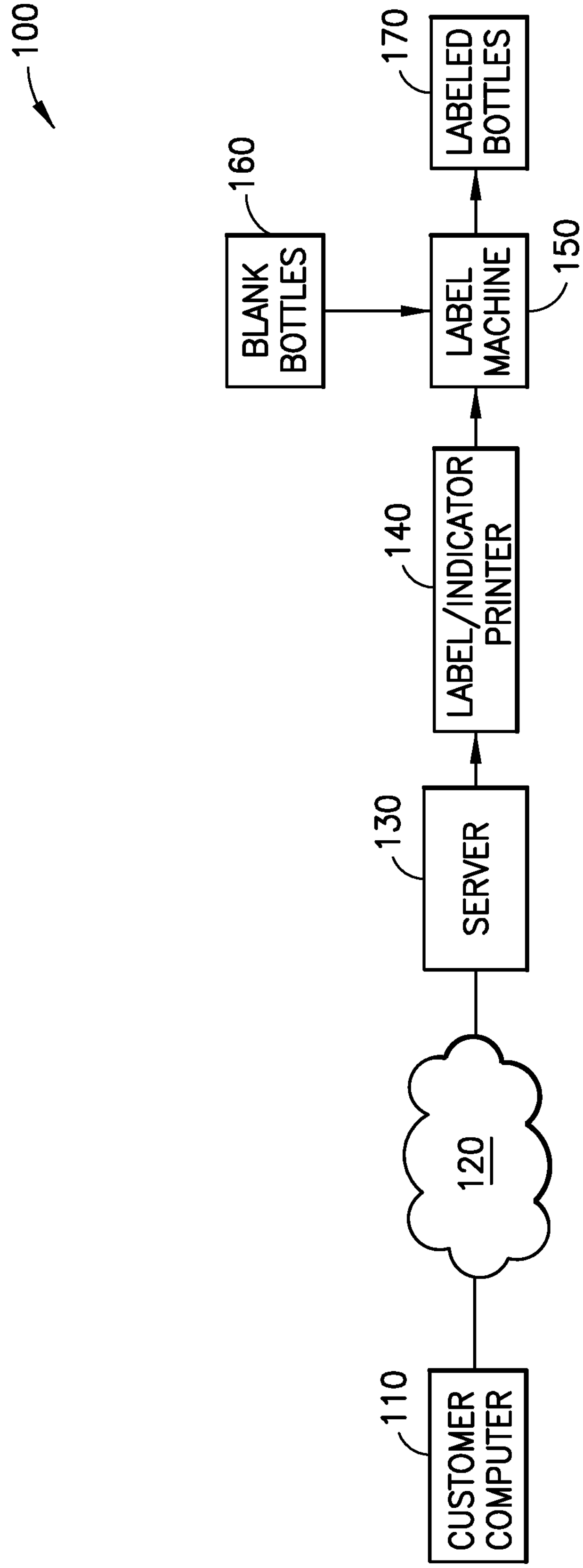
FIG. 1 depicts an embodiment of a system for the custom labeling of products on an item-by-item basis in a continuous production process.

FIG. 1 depicts an embodiment of a system 100 for custom labeling products on an item-by-item basis in a continuous production process. A customer computer 110 is connected to a server 130 of the labeling system 100 via a network 120. The customer may use a web browser to access a user interface of the labeling system 100. The user interface allows the customer (i.e., the user) to select and customize. The method includes generating, using a server, an ordering interface displayed on a web browser running on a user's computer connected to the server via a network. One or more label images, selected or submitted by the user via the ordering interface, are specified in correspondence with one or more ordered products. The label images are transmitted to a printer, the label images being grouped according to ordering user. The method further includes generating an indicator label image providing an order identifier and one or more product identifiers arranged in correspondence with a labeling sequence of the ordered products. The method further includes printing, by the printer, the label images and the indicator label image to produce one or more printed product labels and a printed indicator label. The printed product labels and the printed indicator label are transferred to a labeling machine. The method further includes controlling a conveyor system to release a sequence of unlabeled products based on the product identifiers corresponding to the ordered products. The printed product labels are applied to the unlabeled products, the system comprising a label for consumer items, such as, for example, bottles of wine. The bottles of wine are ordered in this process in association with the customized labels. The server 130 processes orders from numerous customers and arranges the orders into groups according to customer. The server 130 is in communication with a label/indicator printer 140 which prints the custom labels on a roll of blank adhesive-backed labels in a continuous stream. The output of the printer 140 may also include indicator labels which perform particular functions, as discussed in further detail below. The stream of printed labels/indicators from the printer 140 is fed into a labeling machine, either in a continuous or batch manner. The labeling machine 150 receives an input of unlabeled, or partially labeled, filled wine bottles 160, attaches the appropriate label to each bottle 160 and outputs labeled bottles 170 to be shipped to the customers. As discussed in further detail below, the labeling machine 150 reads indicator labels included in the stream of printed labels from the printer 140 to determine how to match each label with the correct bottle of wine and the correct customer order.

In disclosed embodiments, the customer, i.e., the user, may create a desired label image using an ordering website. For example, the user may select a label image from a set of templates provided on the ordering site. The templates may be grouped according to style, occasion, theme, etc., and may have stock phrases. When the user selects a template, the user can accept the stock phrase or change it to a desired phrase, e.g., the user may add text to the stock phrase or replace the text entirely. Thus, the user can have a desired phrase which is mapped to a template from a large library of images. Alternatively, in disclosed embodiments, the user may upload an image to use for the label, such as, for example, a photo. In such a case, the user could upload a family portrait, a family crest, or some other desired image, and then write a message on top of it. In disclosed embodiments, there may be a template category called "headlines" which allows the user to enter a URL of an online posting, e.g., a news or social media post, and the system will use the headline of the post, and possibly an image, as the template for a label. If the user wants a particular headline to appear on a wine label, then the user enters the URL of the article, and the system retrieves the headline, shrinks, wraps, and fits the text for a label. With such features, whether the user trying to make a joke based on a political article of the day or celebrate a win by their favorite sports team, or some other event, it is easy to grab the relevant headline and put it on a bottle of wine.

In disclosed embodiments, the system is configured so that label designs may be received from a number of users at the same time. Therefore, the labels may not be initially batched according to individual customers. The system groups the received labels by the customer order and produces an indicator label which provides, e.g., the order number, how many wines and wine labels are associated with that order, and in what order the labels are to be printed and applied to the bottles.

In disclosed embodiments, a roll of blank labels feeds into the printer, e.g., a roll which is hundreds of feet long and stored on a separate unwinding unit. In disclosed embodiments, the roll of labels is unspooled and fed into the printer. The printed labels may pass directly from the output of the printer to a labeling machine (or subsystem) for application to the bottles. Alternatively, the printed labels may be stored on a winder and moved to the labeling machine/subsystem in batches.

In disclosed embodiments, the printed labels may be transferred between the printer and the labeling machine in batches. For example, the printed labels may be rolled up on a spool as they are printed. The continuous stream of labels may be cut at determined points to form batches. A batch indicator label may be used to determine the predetermined point at which the roll of labels is to be cut. The batch roll is then transferred to the labeling machine and set up to feed the labeling machine. The indicator labels of the batch may be read to determine a sequence of wine bottles to be placed on the conveyor for labeling. In disclosed embodiments, the labels are printed in the reverse order with respect to the order in which they are to be applied to the bottles because the first label read from the spool, i.e., unwound from the spool by the labeling machine, is the last label that was printed. The reading of the batch and indicator labels may be done using a bar code or other scannable code. The batch and indicator labels may also have the information in text form.

The batch processing of labels described above may involve an aggregation of a number of (e.g., 10) customer orders. This approach provides greater efficiency relative to processing one customer order at a time, because the printing process is more efficient when it is printing a continuous stream of labels, as opposed to printing just a few labels, stopping the printing, and then moving the few printed labels to the labeling machine. The batch size may be varied based on practical considerations for a particular labeling set up.

Figure 2:
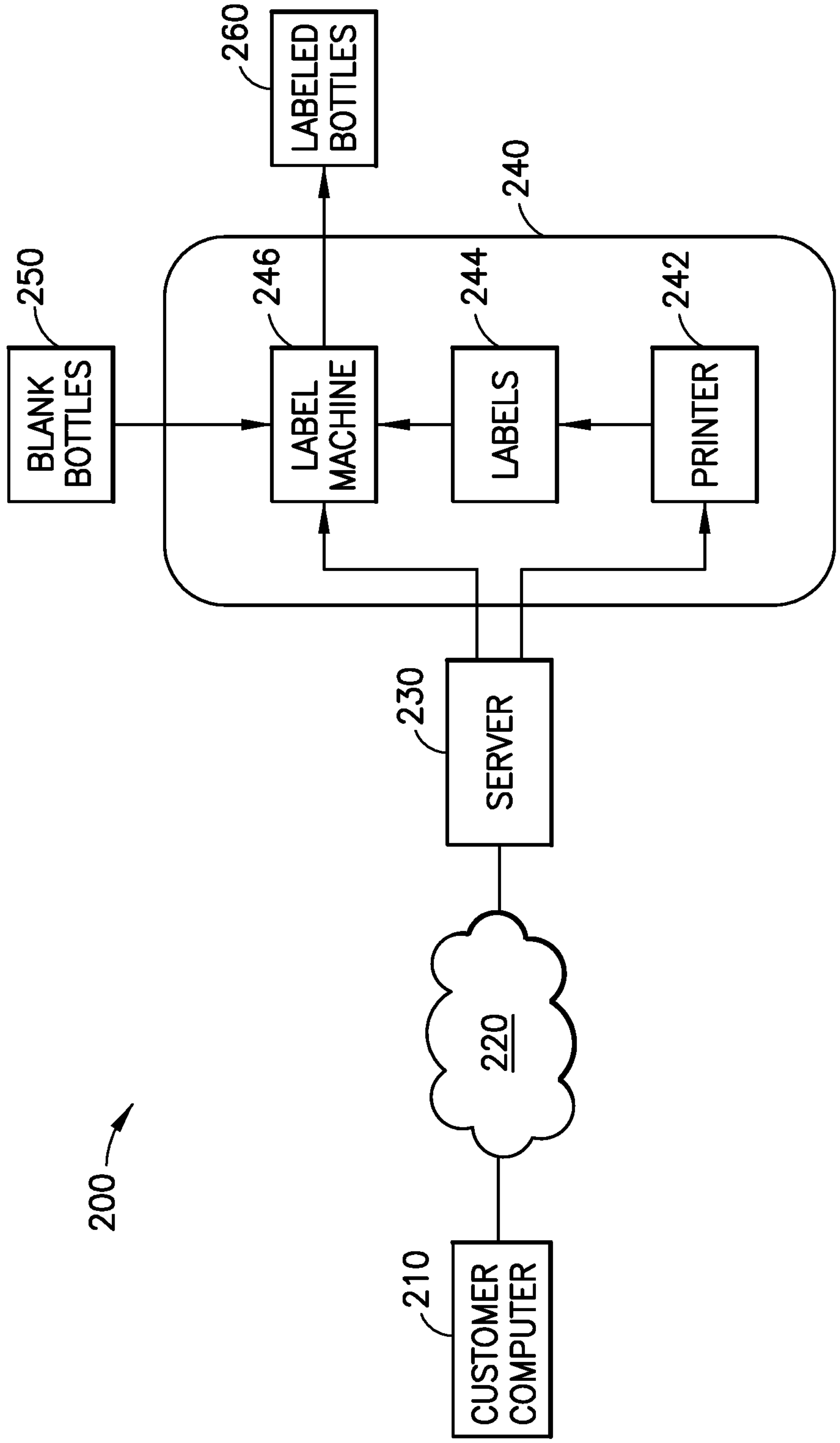
FIG. 2 depicts an embodiment of a system for the custom labeling of products on an item-by-item basis in a continuous production process.

FIG. 2 depicts an embodiment of a system 200 for custom labeling products on an item-by-item basis in a continuous production process. As in the embodiment of FIG. 1, a customer computer 210 is connected to a server 230 of the labeling system 200 via a network 220. The customer may use a web browser to access a user interface of the labeling system 200. The server 230 is in communication with a label printer 242 which prints the custom labels on a roll of blank adhesive-backed labels in a continuous stream. The stream of printed labels 244 may also include indicator labels which perform particular functions which are discussed in further detail below. The stream of printed labels/indicators 244 is fed into a labeling machine 246 in a continuous manner. The labeling machine 246 receives an input of unlabeled, or partially labeled, filled wine bottles 250, attaches the appropriate label to each bottle 250 and outputs labeled bottles 260 to be shipped to the customers. The server 230 controls the printing of the custom labels by the printer 242. The server 230 also provides information to, or directly controls, the labeling machine 246 to match each label with the correct bottle of wine and the correct customer order.

Figure 3:
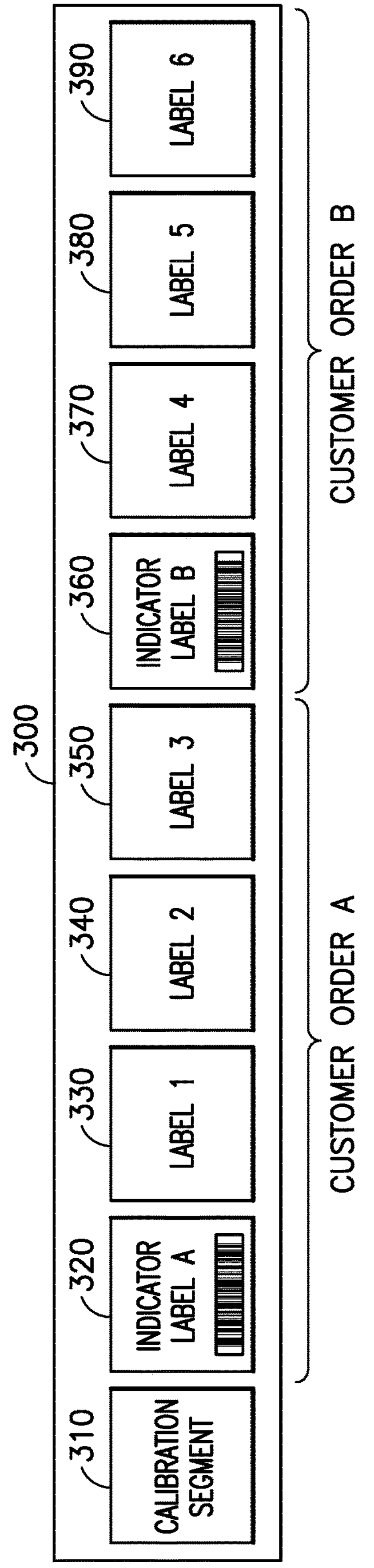
FIG. 3 depicts a portion of a continuous stream of printed labels and indicators for custom labeling wine bottles.

FIG. 3 depicts a portion of a continuous stream of printed labels and indicators 300 for custom labeling wine bottles. The printed labels and indicators 300 may be led by a batch indicator 310 indicating the beginning of a batch of customer orders. Indicator Label A 320 may indicate the beginning of Customer Order A, which may include, for example, three custom labels (330, 340, and 350). Indicator Label B 360 may follow to indicate the beginning of Customer Order B, which may include three custom labels (370, 380, and 390). Although this example shows three custom labels, the number of labels in an order may vary.

The stream of printed labels may also include order indicator labels and batch indicator labels between labels associated with specific customer orders. The order indicator labels provide information which, inter alia, makes it clear that a set of labels (and associated wine bottles) constitute a complete order and should go in one box together. The order indicator labels also make it clear that a specific number of bottles belong to a specific customer, and provide the labeling sequence of the wines so that each label is attached to the proper type of wine, as selected by the customer. For example, a customer may have a first message which is to be affixed to a bottle of rosé (e.g., because the first message is specifically directed to rosé), a second message which is to go on a bottle of white wine, and a third message which is to go on a bottle of red wine. For example, the indicator (or "spacer") label may have information indicating: "Customer ID=12345; Order=3 bottles; L1=rosé, L2=white; L3=red." The information may be encoded in the form of a bar code or other type of scannable code. In disclosed embodiments, the indicator label includes both printed information and a scannable code so that the information can be easily available to human handlers and machines. In disclosed embodiments, the warehouse for handling the bottled wine, before and after labeling, uses a barcode-based system, so barcodes related to the order on the indicator labels would be readable by the same system used to store and move bottled wine in the warehouse.

The indicator label helps to ensure that the order is correct, but also helps ensure that other orders are not subjected to errors. For example, if a wine bottle label were to be misprinted and become wrinkled and lost, a first customer's order of three bottles would receive only two correct labels and then the first label of a second customer's order might be applied to the third bottle. This could cause all of the remaining orders to be shifted by one bottle and, thus, incorrect. The indicator label helps to avoid this situation by calibrating the intervals between orders. As noted above, the indicator label also helps to ensure that the bottles and labels of each customer's order is properly aligned.

Figure 4B:
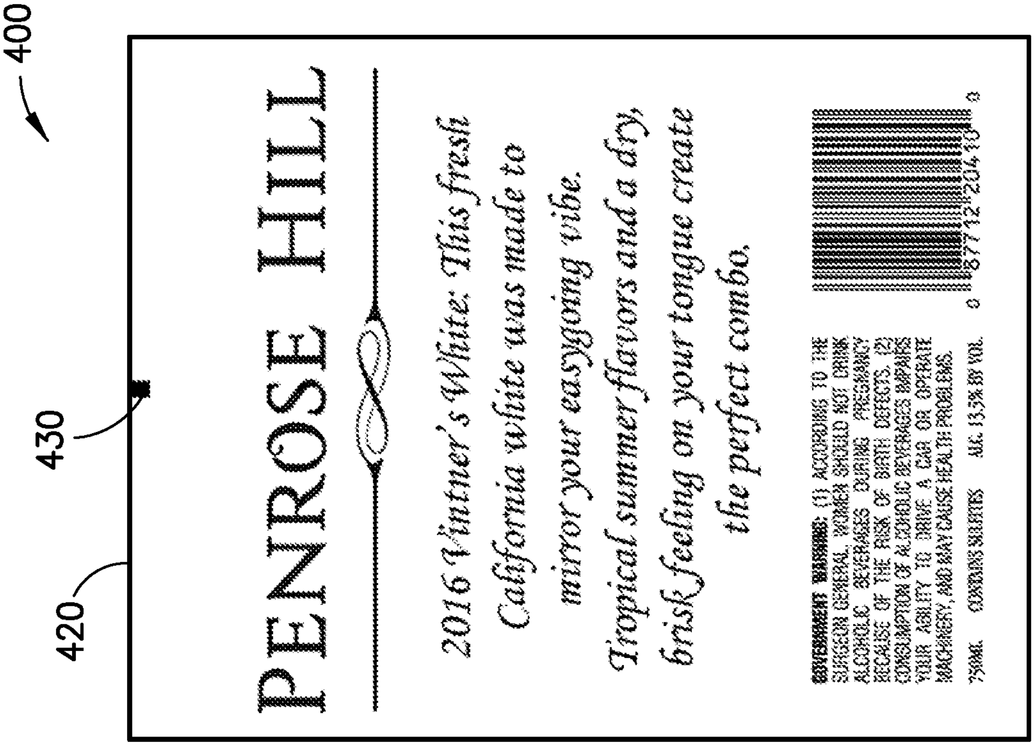
FIGS. 4A and 4B show an example of a custom front label and a back label, respectively, to be applied to a wine bottle.
Figure 4A:
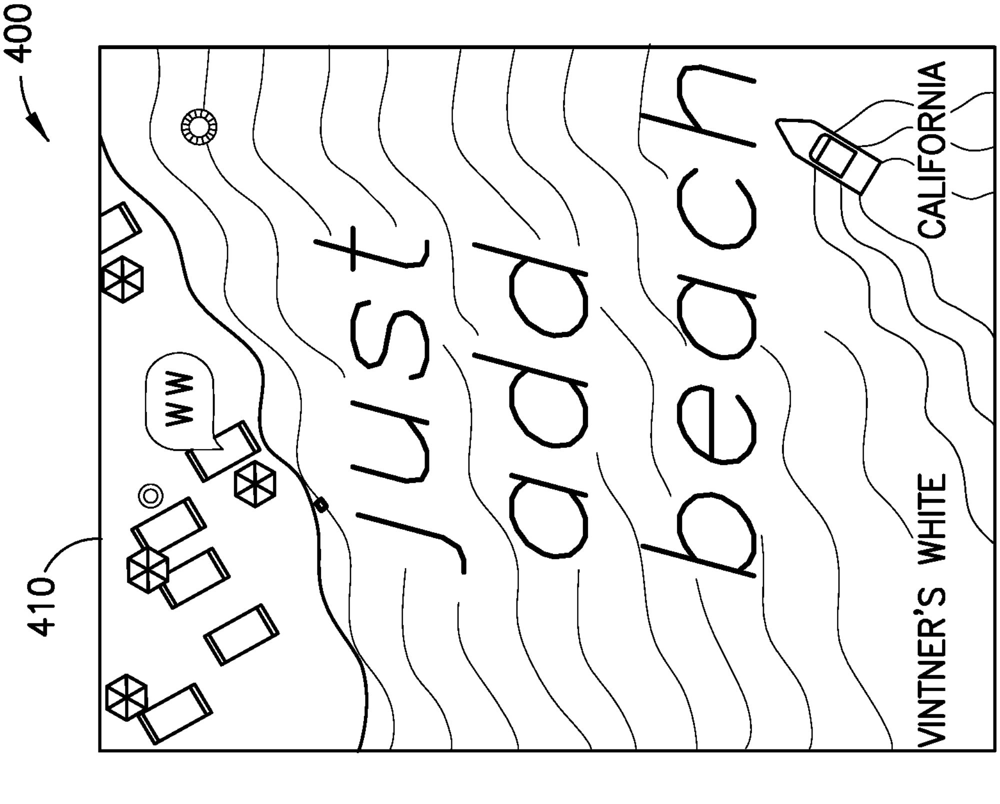

FIGS. 4A and 4B show an example of a custom front label and a back label, respectively, to be applied to a wine bottle.

In disclosed embodiments, the system may have, for example, three types of bottled wine for available labeling, each type of wine being associated with a particular stock-keeping unit (SKU) product identifier. In such a case, there may be three conveyor belts, carrying wines with any combination of SKUs. For example, there may be rosé SKU conveyor, a white SKU conveyor, etc. The output of each bottle-feeding conveyor is blocked by a gate before feeding into a merged conveyor, i.e., the labeling conveyor. The operation of the conveyors and gates may be controlled by the labeling machine. In disclosed embodiments, the printer prints a continuous roll of labels which passes from the output of the printer into the input of the labeling machine. The roll is read (e.g., optically) by the labeling machine to determine the proper sequence for releasing bottles of each type of wine onto the labeling conveyor. Alternatively, a server in communication with the printer and the labeling machine may transmit the indicator label information directly to the labeling machine to allow it to control the bottle-feeding conveyors. It is also possible for at least part of the labeling machine, e.g., the gates, to be controlled directly by the server.

In disclosed embodiments, the back label (see, e.g., FIG. 4B) is applied to the wine bottle when the wine is produced, i.e., the bottles each have a back label but no front label. The front label (see, e.g., FIG. 4A), which is the label customized by the customer, is applied during the process discussed above before the wine is packed and shipped. The front label should be applied only to bottles with a properly corresponding back label (e.g., both must be rosé labels). Furthermore, the front label should be applied in a position precisely opposite to the back label. In disclosed embodiments, guide lines may be printed on each back label, such as, for example, in a bleed area on the outer edge of the label. The printed guide lines are read (e.g., optically) by the labeling machine. Based on the guide lines, the labeling machine is configured to properly align the bottle (e.g., rotate the bottle about its longitudinal axis) to receive the front label in the proper position directly opposite the back label. In disclosed embodiments, the front and back labels may be applied at the same time, in which case the labeling machine will apply the front and back labels directly opposite one another without the need for alignment guide lines.

As a practical matter, there are advantages to applying the back label before and separately from the application of the front label. Wine is typically made in large batches, e.g., in tanks, and then bottled. Moving the wine out of a winery in bottles is easier, from a regulatory point of view, if the bottles already have the legally required Surgeon General's warning (see FIG. 4B) and necessary legal disclaimers on the back label. Alternatively, the labeling system could be set up inside the bonded premises of a winery, in which case the front and back labels could be applied at the same time, as discussed above.

In disclosed embodiments, a high-scale facility, such as a winery, may be used to bottle large quantities of different types of wine to be labeled using the disclosed labeling system. In such a case, the filled bottles may be moved in bond (so that a back label is not necessary), which requires that the bottles are physically wrapped together in quantities for shipment and a barcode is applied to the outside of each shipping pallet. Bonded areas may be created in each of a number of distributed packing warehouses, and the shipped pallets of filled bottles may be unpacked in the bonded areas and labeled using the disclosed labeling system. In such a case, the labeling system would be set up within the bonded area, and the filled bottles would be labeled on the front and back at the same time. The bottles would be brought out of bond after labeling and would already be inside the packing warehouse ready for packing and shipment.

Filled bottles of wine having a back label already attached may be identified by that label, which may have a barcode. In some cases, the filled wine bottles may be easily identifiable, e.g., by color, if only one red wine, one white wine, and one rosé are offered. Otherwise, the cases of bottled wines are barcoded. In disclosed embodiments, each bottle is barcoded, each case of bottles is barcoded, and each pallet of cases is barcoded, each barcoded configuration having a separate SKU which identifies the type and quantity of the product.

In disclosed embodiments, a group of pallets, e.g., 10, 20, or 50 pallets, may contain a particular type of wine, such as red or rosé. The pallets may be stored in pallets racks. The pallets may be barcoded, as well as the corresponding pallet rack locations. The ordering subsystem could produce directions for a forklift driver to pick up a particular pallet for labeling. The operator would read the barcode on the pallet to verify that the pallet was in the correct position, and then would transport the pallet to the input of the appropriate (i.e., associated with the correct SKU) conveyor of filled wine bottles. The shrink wrap would be removed and the bottles would be manually or automatically loaded onto the conveyor for the specific wine type (i.e., for the specific SKU).

In disclosed embodiments, a quality control check of the labeled bottles may be performed to ensure that the correct labels have been properly applied to each bottle. This process may be made more efficient by providing an indicator, e.g., a small barcode in the bottom corner of each label, front and back, which could be optically read and checked in that manner.

In disclosed embodiments, the server detects that a label for a particular type of wine, e.g., a white wine, is being printed (or is about to be printed or has just been printed, depending upon the relative timing of the printer and the labeling machine) and sends a signal to a controller of the labeling machine (or directly controls the labeling machine) to release a bottle of white wine onto the labeling conveyor. In such an arrangement, instead of receiving a stream of labels, reading them, and then controlling the gate, the server will already have informed the labeling machine of the sequence of wine types which are coming up for labeling. For example, the server could indicate that, e.g., five bottles from now, a white wine bottle must be labeled. The controller of the labeling machine (or the server) controls the gate mechanisms based on a known or measured lag time between the release of a particular bottle from the conveyors of filled wine bottles and the actual labeling of the particular bottle. Thus, in disclosed embodiments, there are two different ways to operate the labeling machine: one in which printed labels are optically read as they are received by the subsystem; and one in which the server signals the labeling machine when to release a particular type of filled bottle of wine.

Figure 5:
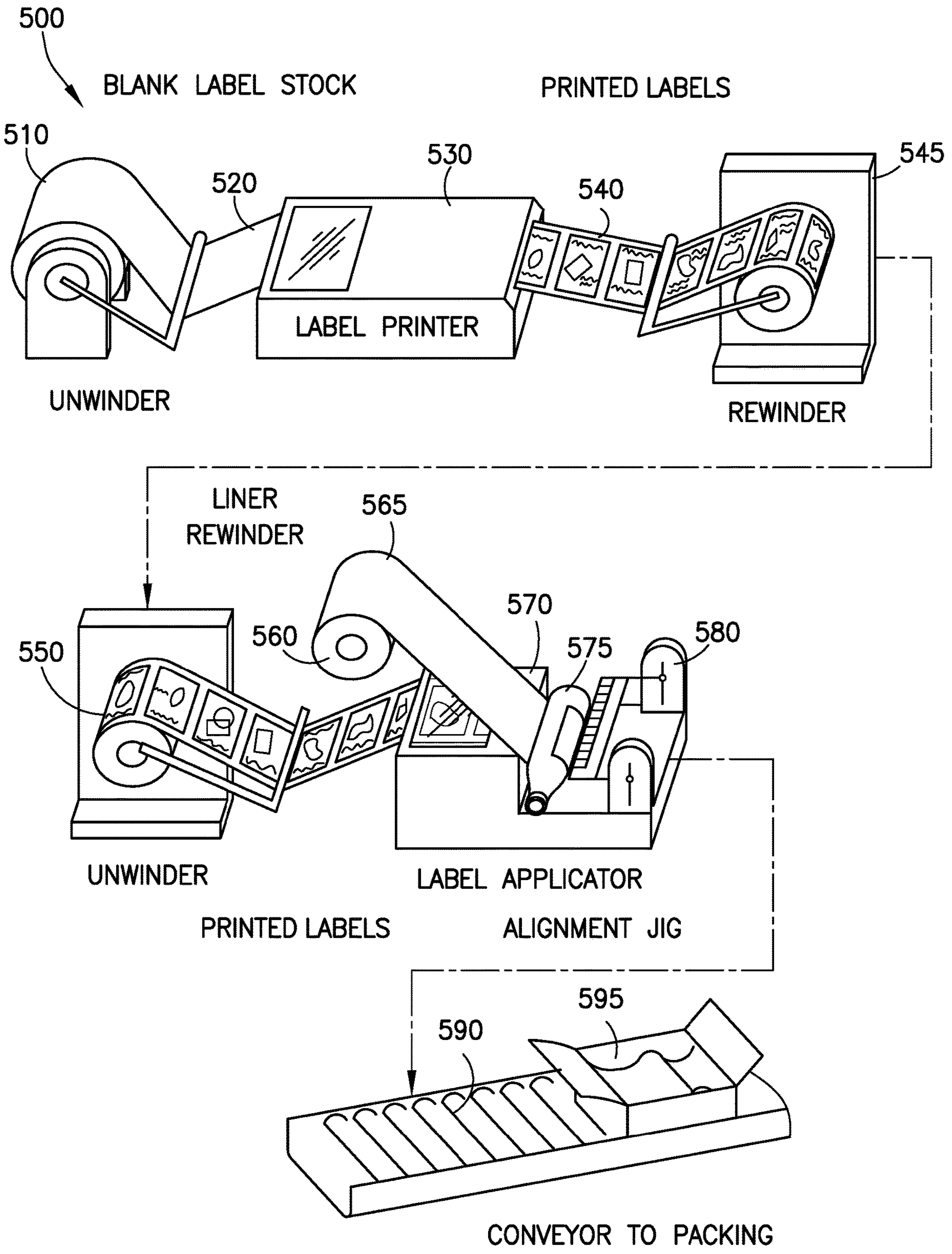
FIG. 5 depicts an embodiment of a system for the printing and processing of custom labels in a continuous production process.

FIG. 5 depicts an embodiment of a system 500 for the printing and processing of custom labels in a continuous production process. A stream of blank label stock 520, mounted on an unwinder 510, is fed into a label applicator 530 (i.e., labeling machine). The outputted stream of printed labels 540 is rewound on a rewinder 545 and transferred as a batch to the label applicator (i.e., labeling machine) 570. The printed labels 540 are unwound on unwinder 550, and fed in a stream into the label applicator 570. The label applicator 570 attaches the appropriate label to each bottle 575 on the conveyor system feeding bottles of wine into the label applicator. The liner rewinder 560 receives the resulting stream of spent label lining 565. An alignment jig 580 is used to orient each bottle 575 for label attachment (e.g., for embodiments in which the front label must be applied directly opposite an already-applied back label). The labeled bottles 595 are fed onto the output conveyor 590 for packing.

Figure 6:
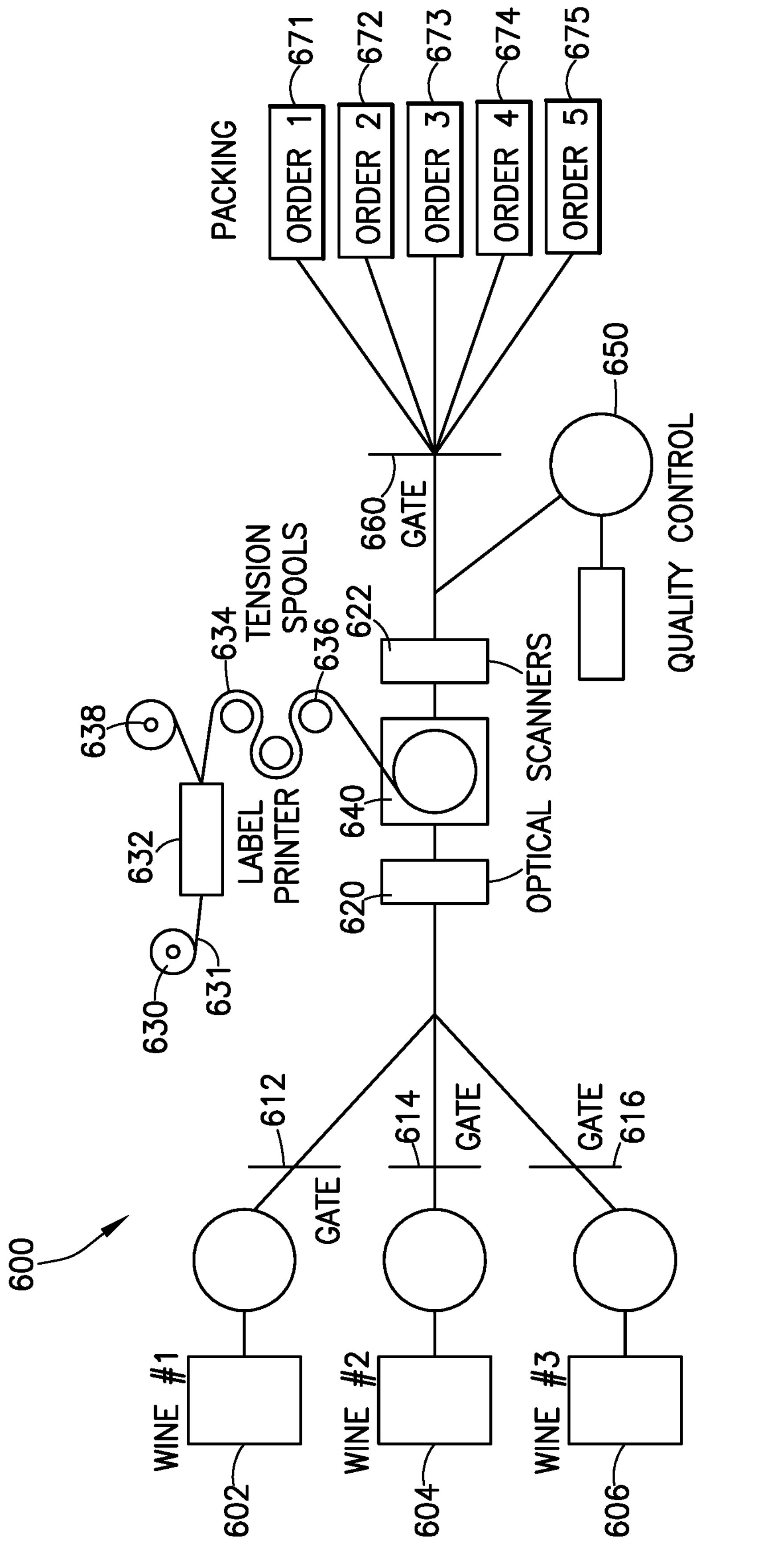
FIG. 6 depicts an embodiment of a system for the printing and processing of custom labels in a continuous production process with an array of gated feed conveyors.

FIG. 6 depicts an embodiment of a system 600 for the printing and processing of custom labels in a continuous production process with an array of gated feed conveyors. Quantities of different types of wines 602, 604, and 606 are respectively held behind gates 612, 614 and 616 which release the appropriate wine for application of the incoming labels 634. In this embodiment, the label printer 632 receives a stream of blank labels on a liner 631 from a roll of blank labels 630, and outputs a stream of printed labels 634 onto tension spools 636, and into a label applicator (i.e., labeling machine) 640. The bottles are fed into the label applicator 640, between optical scanners 620 and 622, and labeled. Label liner stream 631 is fed into a liner rewinder 638 after passing through the printer 632 (the rewinder 638 may be positioned after the tension spools 636). Labelled bottles are output to gate 660, with some portion diverted to a quality control station 650, which may include an optical scanner which inspects the labels for defects, e.g., wrinkling and incorrect placement. An output gate 660 selectively outputs the labeled bottles to a number of packing stations (671, 672, 673, 674, and 675) according to customer.

Figure 7:
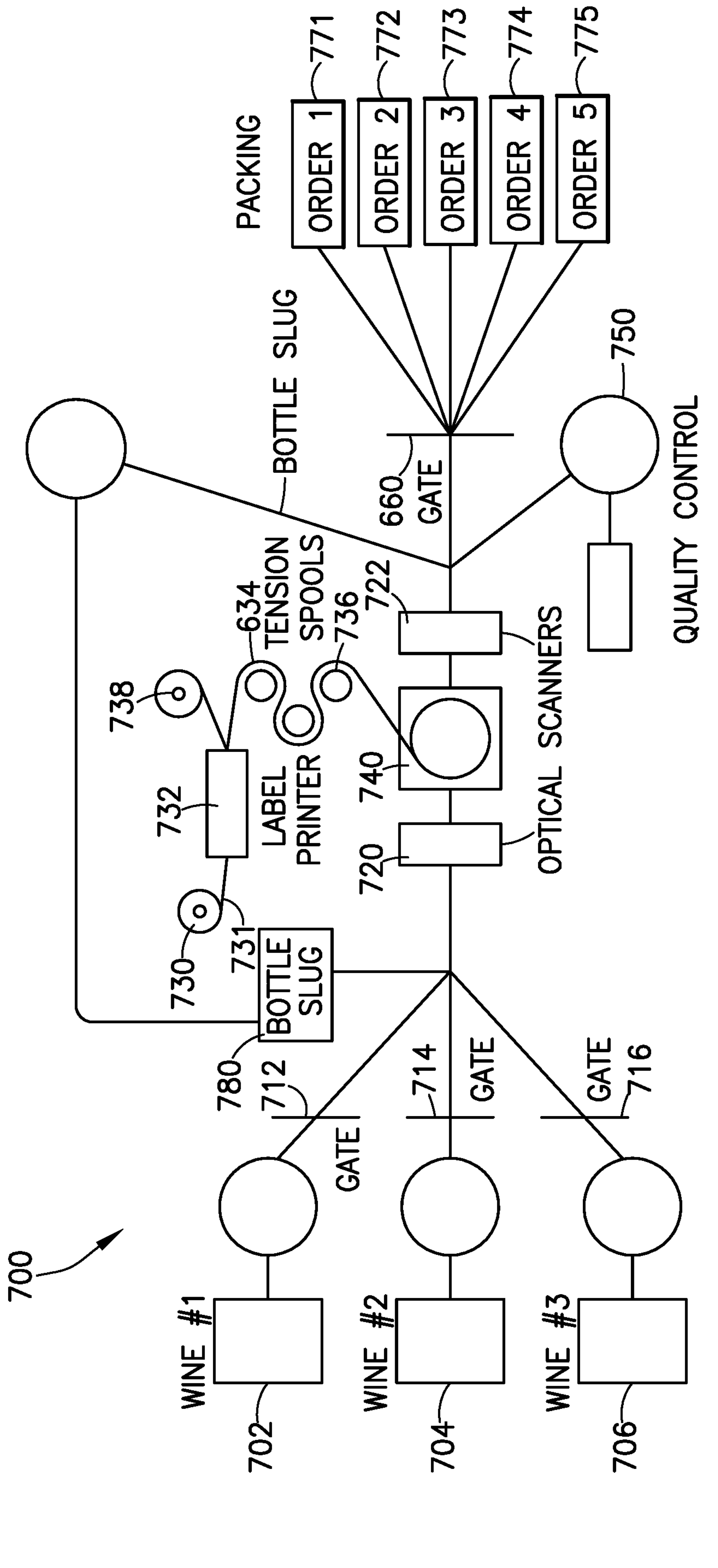
FIG. 7 depicts an embodiment of a system for the printing and processing of custom labels in a continuous production process with an array of gated feed conveyors and bottle slugs.

FIG. 7 depicts an embodiment of a system 700 for the printing and processing of custom labels in a continuous production process having an array of gated input feed conveyors. Quantities of different types of wines 702, 704, and 706 are respectively held behind gates 712, 714 and 716 which release the appropriate wine for application of the incoming labels 734. A label printer 732 receives a stream of blank labels on a liner 731 from a roll of blank labels 730, and transfers a stream of printed labels 734 onto tension spools 736, and into the label applicator (i.e., labeling machine) 740. The bottles are fed into the label applicator 740, between optical scanners 720 and 722, and labeled. The label liner stream 731 is fed into a liner rewinder 738 after passing through the printer 732 (the rewinder 738 may be positioned after the tension spools 736). The labelled bottles are output to a gate 760, with at least a portion diverted to a quality control station 750. An output gate 760 selectively outputs correctly labeled bottles to packing stations 771, 772, 773, 774, and 775 according to customer. A blank bottle slug 780 circulates through optical scanners 720 and 722, and the label applicator 740 between each customer order. If the optical scanner 722 detects an issue with the bottle slug 780 (e.g., a different bottle), then at least a portion of the customer order is directed to quality control station 750, allowing for review and correction.

Figure 8:
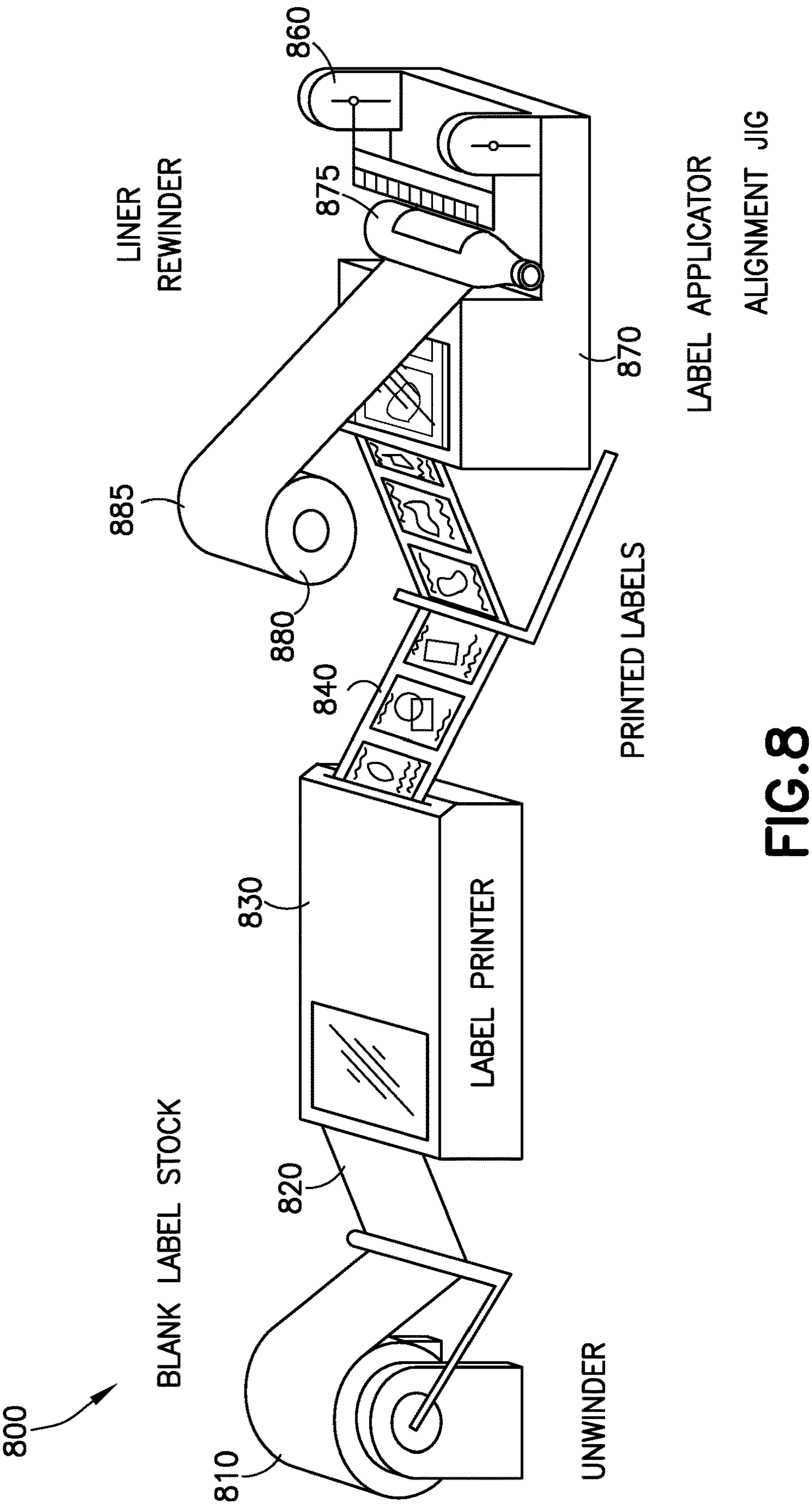
FIG. 8 depicts an embodiment of a system for the printing and processing of custom labels in a continuous production process.

FIG. 8 depicts an embodiment of a system 800 for the printing and processing of custom labels in a continuous production process in a continuous stream. A stream of blank label stock 820, mounted on an unwinder 810, is fed into a label printer 830. A stream of printed labels 840 output by the label printer 830 is fed directly into a label applicator (i.e., labeling machine) 870. The label applicator 870 attaches the appropriate labels to each bottle 875. A liner rewinder 880 receives the resulting stream of spent label liner 885. An alignment jig 860 is used to correctly orient each bottle 875 for label attachment (e.g., for embodiments in which the front label must be applied directly opposite an already-applied back label).

Figure 9A:
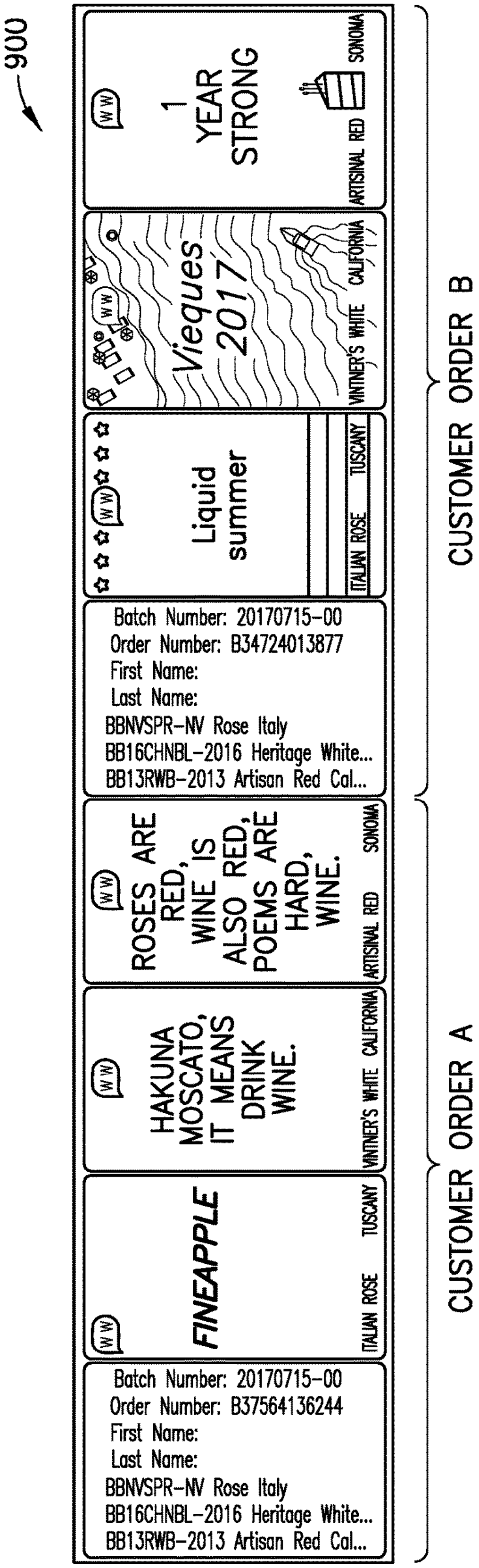
FIGS. 9A and 9B show an example of a custom front label to be applied to a wine bottle.
Figure 9B:
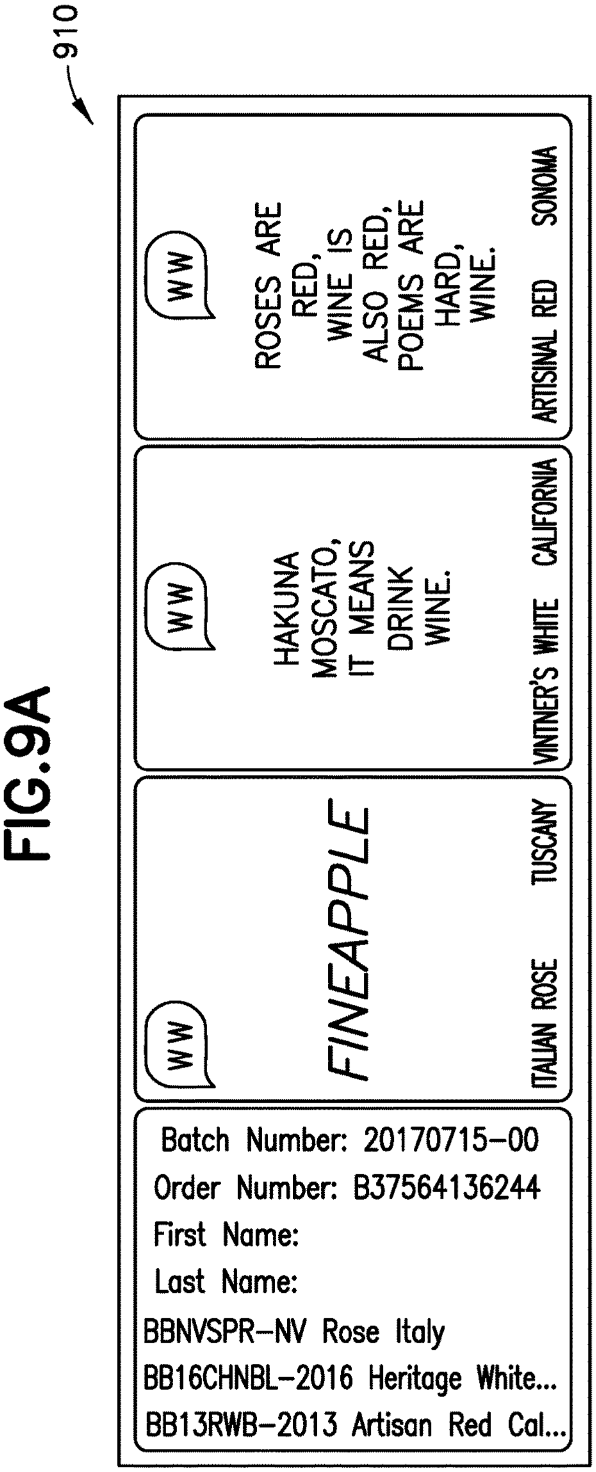

FIGS. 9A and 9B show an example of a custom front label to be applied to a wine bottle according to some embodiments.

In disclosed embodiments, an apparatus may be provided which comprises a general-purpose or special-purpose computing apparatus and which may execute program code to perform any of the functions described herein. The apparatus may comprise an implementation of one or more elements of the system 100. The apparatus may include additional elements which are not mentioned below, according to some embodiments. The apparatus includes a processor operatively coupled to a communication device, data storage device/memory, one or more input devices, and one or more output devices. The communication device may facilitate communication with external devices, such as an application server. The input device(s) may comprise, for example, a keyboard, a keypad, a mouse or other pointing device, a microphone, knob or a switch, an infra-red (IR) port, a docking station, and/or a touch screen. The input device(s) may be used, for example, to manipulate graphical user interfaces and to input information into the apparatus. The output device(s) may comprise, for example, a display (e.g., a display screen) a speaker, and/or a printer. The data storage device/memory may comprise any device, including combinations of magnetic storage devices (e.g., magnetic tape, hard disk drives and flash memory), optical storage devices, Read Only Memory (ROM) devices, Random Access Memory (RAM) etc. The storage device stores a program and/or platform logic for controlling the processor. The processor performs instructions of the programs and thereby operates in accordance with any of the embodiments described herein, including but not limited to the processes. The programs may be stored in a compressed, uncompiled and/or encrypted format. The programs may furthermore include other program elements, such as an operating system, a database management system, and/or device drivers used by the processor to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A method for custom labeling products, the method comprising:

receiving, by a server from one or more users via a purchasing interface, input specifying one or more product label images in correspondence with one or more products;

generating a label group for each of the one or more users, the label group comprising:

an indicator label image providing an order identifier and one or more product identifiers; and the one or more product label images arranged in a labeling sequence specified by the product identifiers;

printing the label groups to produce one or more printed label groups;

controlling a conveyor system to release, based on the indicator label image for each of the printed label groups, the sequence of the one or more products specified by the one or more product identifiers in each respective indicator label image; and controlling a labeling machine to apply printed product labels of each of the printed label groups to the released sequence of the one or more products and to output the labeled products.

2. The method of claim 1, wherein the printed label groups are transferred to the labeling machine continuously.

3. The method of claim 1, wherein the labeling machine reads the indicator label image of each printed label group to perform the controlling of the labeling.

4. The method of claim 1, wherein the labeling machine is controlled by the server to perform labeling according to the sequence of the products.

5. The method of claim 1, wherein the specifying of the one or more product label images comprises creating a product label image using the purchasing interface.

6. The method of claim 5, wherein the creating of the product label image comprises selecting a template from a set of templates and editing associated text to be displayed in the created product label image.

7. The method of claim 5, wherein the creating of the product label image comprises adding an image to be displayed in the created product label image.

8. The method of claim 5, wherein the creating of the product label image comprises entering a uniform resource locator identifying one or more images and/or text to be displayed in the created label image.

9. The method of claim 8, wherein the uniform resource locator identifies at least one of a news article and a social media post.

10. The method of claim 1, wherein the products are bottles of wine and the printed product labels form front labels for the bottles, the bottles having back labels affixed prior to being loaded in the conveyor system.

11. The method of claim 10, wherein the labeling machine is configured to rotate the bottles to align placement of the front labels opposite the back labels based on guide lines formed on the back labels.

12. The method of claim 1, wherein the generating of the label group for each of the one or more users comprises:

receiving specified product label images from a plurality of users of the one or more users;

grouping the received product label images for each user of the plurality of users; and creating the indicator label image based on the grouped product label images.

13. The method of claim 1, wherein the conveyor system comprises a plurality of product feeds, each of the feeds having a gate that is controlled to release products in the sequence specified by the product identifiers of the label group for each of the one or more users.

14. A system for custom labeling products, the system comprising:

a server having a processor and memory and being configured to receive input from one or more users specifying one or more product label images in correspondence with one or more products, generate a label group for each of the one or more users, the label group comprising an indicator label image providing an order identifier and one or more product identifiers, and the one or more product label images arranged in a sequence specified by the product identifiers;

a printer configured to print the label groups to produce one or more printed label groups;

a conveyor system configured to be controlled to release, based on the indicator label image for each of the printed label groups, the sequence of the one or more products specified by the one or more product identifiers in each respective indicator label image; and a labeling machine configured to receive the printed labeling groups and apply printed product labels of each of the printed label groups to the released sequence of the products and to output the labeled products.

15. The system of claim 14, wherein the labeling machine is configured to receive the printed labeling groups continuously.

16. The system of claim 14, wherein the labeling machine is further configured to read the indicator label image of each printed label group to perform the controlling of the labeling.

17. The system of claim 14, wherein the labeling machine is configured to be controlled by the server to perform labeling according to the sequence of the products.

18. The system of claim 14, wherein the purchasing interface is further configured to accept input creating a product label image for the specifying of the one or more product label images.

19. The system of claim 14, wherein the products are bottles of wine and the printed product labels form front labels of the bottles, the bottles having back labels affixed prior to being loaded in the conveyor system, and wherein the labeling machine is configured to rotate the bottles to align placement of the front labels opposite the back labels based on guide lines formed on the back labels.

20. The system of claim 14, wherein the conveyor system comprises a plurality of product feeds, each of the feeds having a gate that is controlled to release products in the sequence specified by the product identifiers of the label group for each of the one or more users.

21. A non-transitory computer-readable medium storing program instructions executed by at least one processor of a computer system having memory, the medium comprising instructions for causing the at least one processor to perform a method for custom labeling products, the method comprising:

receiving, by from one or more users via a purchasing interface, input specifying one or more product label images in correspondence with one or more products;

generating a label group for each of the one or more users, the label group comprising:

an indicator label image providing an order identifier and one or more product identifiers; and the one or more product label images arranged in a labeling sequence specified by the product identifiers;

printing the label groups to produce one or more printed label groups;

controlling a conveyor system to release, based on the indicator label image for each of the printed label groups, the sequence of the one or more products specified by the one or more product identifiers in each respective indicator label image; and controlling the applying of printed product labels of each of the printed label groups to the released sequence of the one or more products and to output the labeled products.

22. The computer-readable medium of claim 21, wherein the specifying of the one or more product label images comprises creating a product label image using the purchasing interface.

23. The computer-readable medium of claim 22, wherein the creating of the product label image comprises selecting a template from a set of templates and editing associated text to be displayed in the created product label image.

24. The computer-readable medium of claim 22, wherein the creating of the product label image comprises adding an image to be displayed in the created product label image.

25. The computer-readable medium of claim 22, wherein the creating of the product label image comprises entering a uniform resource locator identifying one or more images and/or text to be displayed in the created label image.

26. The computer-readable medium of claim 21, wherein the generating of the label group for each of the one or more users comprises:

receiving specified product label images from a plurality of users of the one or more users;

grouping the received product label images for each user of the plurality of users; and creating the indicator label image based on the grouped product label images.

* * * * *